Oct. 20, 1925.
M. R. DE FRANCE
1,557,670
METHOD OF MAKING BRAKE SHOES
Original Filed Nov. 10, 1924
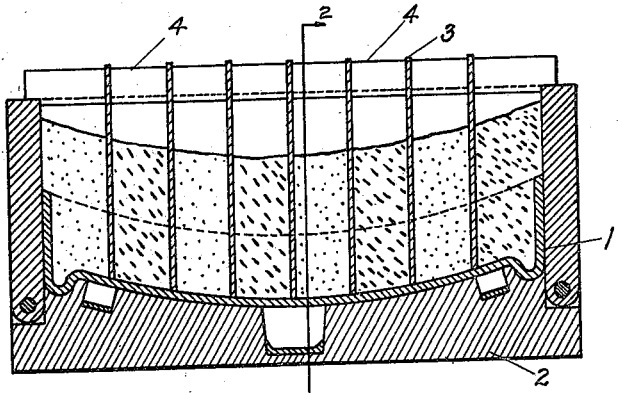
FIG. 1.
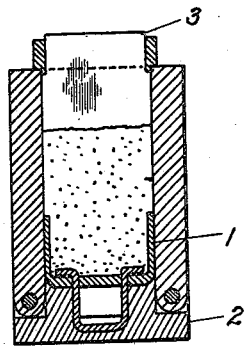
FIG. 2.
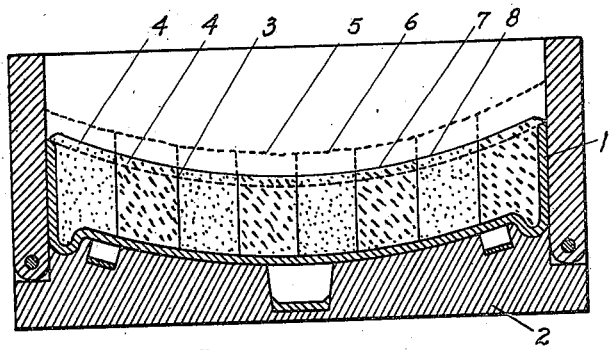
FIG. 3.
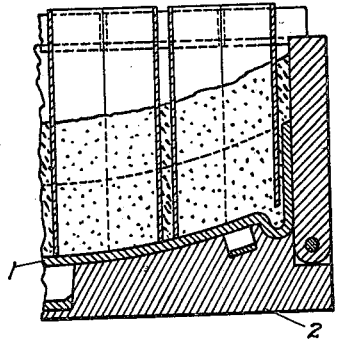
FIG. 8.
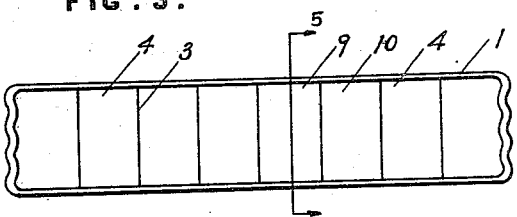
FIG. 4.
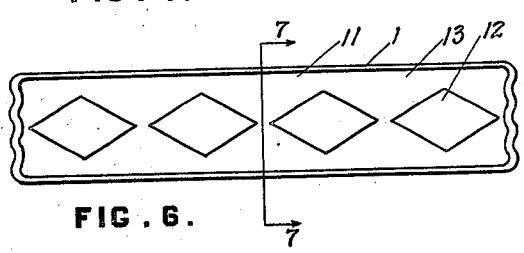
FIG. 6.
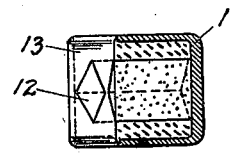
FIG. 5.
FIG. 7.
INVENTOR
Murrell R. De France
by William B. Wharton
his attorney Patented Oct. 20, 1925.

1,557,670

UNITED STATES PATENT OFFICE.

MURRELL R. DE FRANCE, OF BELLEVUE, PENNSYLVANIA.

METHOD OF MAKING BRAKE SHOES.

Original application filed November 10, 1924, Serial No. 748,863. Divided and this application filed April 18, 1925. Serial No. 24,070.

*To all whom it may concern:*

Be it known that I, MURRELL R. DE FRANCE, a citizen of the United States, residing at Bellevue, in the county of Allegheny and State of Pennsylvania, have invented a new and useful Improvement in a Method of Making Brake Shoes, of which the following is a specification.

This invention relates to a method of making a pressed metal and composition brake shoe for use on railway cars and similar vehicles, and to a method of making a filling block constituting an element of such brake shoe; this application constituting a division of application Serial No. 748,863, filed November 10, 1924.

For a long time previous to the present invention a wide variety of substances have been utilized in filling compositions for brake shoes. Among such substances may be noted fibrous asbestos, coke, cement, iron borings, iron ore, plaster, plumbago, rosin, sand, sawdust, wood, and other vegetable fibers. Various oxidizing vegetable oils and various gums have been used as a binder for these dry ingredients. When plaster or cement has been used as an ingredient of the composition, water has been added to set and harden the composition as a whole.

Brake shoes of the general type mentioned, that is brake shoes comprising a shell of pressed metal and a filling of a composition formed of various ingredients, present certain advantages over the cast metal brake shoes commonly in use. Such advantages reside chiefly in manufacturing economy, which is so great that composition brake shoes would largely displace cast metal shoes if the former performed under all conditions of use in as satisfactory a manner as the cast shoe.

It may be stated in connection with cast iron shoes, that the wear on the face of a cast iron brake shoe is by granulation. Under given pressure and load the friction produced by this shoe on a wheel increases in proportion to the square of pressure until the temperature of the shoe is that of a dull red heat, at which point the friction decreases in direct proportion to the further heat generated. It is to be understood, of course, that under an excessive pressure such as is produced by a stuck brake, a cast metal shoe, or any other brake shoe, would be burned up.

The wearing away of a composition brake shoe is by pulverization as contrasted with granulation. The wear of the composition shoe being by pulverization, the shoe and wheel in time become so highly polished that the contact between the two is almost perfect. When this condition is produced, an excessive friction greater than that specified for the purpose for which the shoe is used is developed. It will be understood that this perfect contact and excessive friction is a condition which is not possible with a brake shoe which wears away by granulation.

It should be understood, also, that the compositions which constitute the filling material for pressed shell and composition brake shoes, are very poor conductors of heat. This fact avoids limitation of the friction developed by the shoe, as is the case when a cast metal shoe reaches a red heat.

Previous failure of composition brake shoes to compete successfully with cast metal shoes may be traced to three defects, which had to be overcome in order to render them satisfactory under all conditions of use as the cast shoe. The first problem was to provide a suitable shell, which would not injure the tread of the wheel to which the brake was applied. This defect has been gradually eliminated by experiment and invention. The second problem was the development of a filling composition which would carry the crushing load of braking a wheel, independently of the shell in which the composition is carried. This problem is inherently connected with the first, as its solution was necessary in order to secure a shell which would not injure the tread of a wheel. It has also been successfully solved. The third problem has been the development of a composition filling which would conform to the specifications of railroads for requisite friction and life, and which would also approximate the functioning of a cast metal shoe under all conditions of service and at all times during the life of the shoe.

It is this latter problem which has hitherto remained unsolved, and which at the present time limits the use of composition brake shoes. The disadvantages which must be overcome are those of a wearing by pulverization to result in perfect contact between the brake shoe and wheel with a resultant development of friction in excess of that specified. For this reason the use of composition brake shoes has been limited to freight cars only. For if a composition shoe be placed on passenger cars, it will be found that the heat generated by excessive friction will be beyond the factor of safety in the operation of trains, and that serious injury to the treads of the wheels on such trains will be produced.

The manufacturers of composition brake shoes have been aware of this defect, and its disastrous consequences in the use of the brake shoes for years, but attempts to remedy this defect have hitherto been ineffective or impractical. During experimental work it was found that the various filling compositions would not develop uniform friction throughout the life of the brake shoe. Thus if the brake shoe was capable of giving the specified requisite friction upon its first application; by the time the shoe was partially worn away, and the shoe and the tread of the wheel to which it was applied had become thoroughly polished, the friction was far beyond the proper specifications. In conducting such work the inventor herein has made and tested composition brake shoes in which the coefficient of friction increased as greatly as thirty per cent during the life of the shoe. Compositions in which the coefficient friction did not increase with use of the shoe varied from an insufficient initial friction to substantially no effective initial friction whatever.

The general object of the invention is, therefore, to provide a method of making a composition filler of such nature that it may be used in a pressed metal shell to form a composition brake shoe capable of approximating the effect of a cast metal brake shoe under all conditions of use, and throughout the entire life of the shoe.

One specific object of the invention is to provide a method of compacting in a single integral block of filling composition areas or strata of different grades of composition, which have different coefficients of friction.

Another object of the invention is to provide a method of compacting in a single integral block of filling composition areas or strata of different grades of composition, which wear away at different rates during the useful life of the brake shoe.

In the accompanying drawings Figure 1 is a vertical sectional view through a mold and brake shoe shell, illustrating one step in making a brake shoe by compacting a composition filler into the shell according to the present invention; Figure 2 is a cross sectional view on the line 2—2 of Figure 1; Figure 3 is a view similar to Figure 1, but illustrating a more advanced step in conducting the method; Figure 4 is a bottom plan view of a completed brake shoe made according to the present method, and in the manner illustrated in Figures 1, 2, and 3; Figure 5 is a cross sectional view on the line 5—5 Figure 4; Figure 6 is a bottom plan view of a completed brake shoe having a modified arrangement of the various areas of the different grades of filling composition; Figure 7 is a cross sectional view on the line 7—7 Figure 6; and Figure 8 is a fragmentary vertical sectional view illustrating a manner of conducting the method of the present invention to produce an effect in the completed brake shoe generally similar to that illustrated in Figures 6 and 7.

In conducting the process of the present invention, as illustrated in Figures 1, 2, and 3 of the drawings, a brake shoe shell 1 of pressed metal is laid in a mold 2 in the position shown. Thin partition members 3, which may be composed of tin or other suitable material, are then inserted, as shown, so that they extend downwardly to the interior surface of the back of the shell and extend upwardly almost to the top of the mold. Filling composition in a plastic and readily compressible condition is then introduced into the compartments 4 formed in the brake shoe shell and mold by the partitions 3. In pursuance of the present invention, the filling composition used comprises two or more different grades. The drawings show composition of two different grades used to form the filling block of the shell, the different grades of composition being introduced into alternate compartments throughout the length of the shell.

A suitable instrument is then introduced into each of the compartments 4, and both grades of filling composition 5 and 6 are pressed down into the position shown by dotted lines in Figure 3 of the drawings, to compact the composition. This operation may be performed by hand.

The final pressing operation is then performed under a relatively high pressure, and results in the formation of a single integral block of filling composition 7, which has along its working face 8 and extending vertically of the brake shoe shell alternate areas 9 and 10 formed by the different grades 5 and 6 of the filling composition. The brake shoe is then in condition for baking to effect the final hardening of the composition filling block 7.

It should be noted that the brake shoe as completed does not comprise a plurality of separate blocks, which must be interlocked or otherwise mutually secured to each other or held in position by a resilient pressure of the brake shoe shell. The block is, as stated, a single integral block, but consists of vertical stratifications or areas providing areas of composition with different characteristics.

Instead of the vertically stratified areas of varying forms of composition, areas of one or more varying grades of composition may be introduced in a filling block having a surrounding area of uniform composition. This arrangement is shown in Figures 6, 7, and 8 of the drawings. In this modified arrangement the brake shoe shell 1 is provided with a filling block 11, which comprises areas 12 of one grade of composition and a surrounding area 13 of a dissimilar grade. The areas 12 and 13 both extend vertically the entire depth of the brake shoe shell, as is shown in Figure 8. In order to form a brake shoe having a filling block so arranged, it is only necessary to vary the arrangement shown in Figures 1 to 4 by introducing into the mold and shell partition members, which have closed sides, instead of the simple single wall partition as shown in the drawings. In such case one grade of composition in a plastic condition may be introduced outside the closed partition members or tubes, and one or more varying grades, likewise in plastic condition, introduced into the tubes. The operation of a preliminary pressing to compact the material, and the final pressing operation, are then identical with such steps as described above.

It will be understood that in this modified form of brake shoe the secondary composition may be introduced by means of tubular members of any desired form to provide areas of any desired shape in the final filler.

As has been previously stated, at least two formulæ should be employed in providing the composition of the different areas of the filling block. In order to effect the objects of the invention, these formulæ must be such that different areas having at least two different coefficients of friction are provided on the working face of the filling block not only initially but during the entire life of the brake shoe, as the block is worn away in use. It is also highly desirable that the material in one set of areas should tend to be worn away more rapidly than the material in the other set of areas. This is effected in practice by having one or more areas or sets or areas comprise material which tends to pulverization with great rapidity. This effect causes the working face of the block to be constantly covered with loose material, thus preventing perfect contact between the wheel and the area or areas which are less susceptible to disintegration. It is also desirable that a certain ingredient, or certain ingredients, of such area or areas be such as to cause the loose material to be as coarse as possible, thus approximating the effect of a cast metal brake shoe during its wear by granulation.

Desirable formulæ for the different grades of composition are given in copending application Serial No. 748,863, filed November 10, 1924, of which the present is a divisional application. In conducting the method the various areas of plastic composition, which are to be compacted into a single intergal block, may comprise compositions as disclosed in these formulæ, or any other composition which will produce satisfactory results in use. It is of course a prerequisite that the composition be compressible while in a plastic condition and that it may be hardened, by exposure to air or by baking, into the desired integral block.

It should also be understood that the method of the present invention produces no novel advantage in the completed brake shoe, unless the integral filling block produced is composed of two or more grades of composition which have different characteristics. The final block should thus comprise two or more grades of composition which vary either in their coefficients of friction, or in their rate of disintegration, or in their inherent tendency to become pulverized in use, or in any two or all of these characteristics. It is to be noted that while the process shows the method as conducted with only two grades of composition, no change in the conduct of the method is necessary in order to incorporate three or more different grades in a single filling block.

It should be further understood that composition filling blocks for pressed metal shells may be made by pressing the bodies of different grades of composition in a mold apart from the shell. This block may be then separately baked, and the metal shell folded and pressed around the integral block of filling composition.

What I claim is:

1. The method of making a composition brake shoe which consists in positioning a pressed metal shell within a mold, dividing the shell within the shell and mold by temporary partitions, inserting into different compartments formed by such partitions various grades of filling composition in a plastic condition, withdrawing such partitions, and pressing the body of composition to compact the same into a single integral block.

2. The method of making a composition brake shoe which consists in positioning a pressed metal shell within a mold, dividing the space within the shell and mold by means of temporary partitions, inserting into different compartments formed by such partitions various grades of filling composition in a plastic condition, pressing the composition lightly within the compartments to compact it initially, withdrawing the partitions, and subjecting the body of the composition to relatively high pressure to compact the same into a single integral block.

3. The method of making a composition brake shoe which consists in positioning a pressed metal shell within a mold, inserting into the shell and mold a plurality of grades of filling composition while in plastic condition in such manner that the several grades form separate areas therein, and pressing the body of the composition to compact the same into a single integral block.

4. The method of making a composition brake shoe which consists in positioning a pressed metal shell within a mold, inserting into the shell and mold a plurality of grades of filling composition while in a plastic condition in such manner that the several grades form separate strata therein, and pressing the body of the composition to compact the same into a single integral block.

5. The method of making a composition brake shoe which consists in positioning a pressed metal shell within a mold, introducing into the shell and mold a plurality of grades of filling composition while in a plastic condition in such manner that the several grades form separate vertical strata therein, and pressing the body of composition to compact the same into a single integral block.

6. The method of making a composition filling block for use in the pressed metal shell of a composition brake shoe which consists in introducing into a mold a plurality of grades of filling composition while in a plastic condition in such manner that the several grades form separate strata therein, and pressing the body of composition to compact the same into a single integral block.

7. The method of making a composition filling block for use in the pressed metal shell of a composition brake shoe which consists in introducing into a mold a plurality of grades of filling composition while in a plastic condition in such manner that the several grades form separate vertical strata therein, and pressing the body of composition to compact the same into a single integral block.

8. The method of making a composition filling block for use in the pressed metal shell of a composition brake shoe which consists in introducing into a mold a plurality of grades of filling composition while in a plastic condition in such manner that the several grades form separate areas therein, and pressing the body of composition to compact the same into a single integral block.

9. The method of making a composition filling block for use in the pressed metal shell of a composition brake shoe which consists in dividing the space within a mold by means of removable partitions, inserting into different compartments formed by such partitions various grades of filling composition, and pressing the body of composition to compact the same into a single integral block.

10. The method of making a composition filling block for use in the pressed metal shell of a composition brake shoe which consists in dividing the space within a mold by means of removable partitions, inserting into different compartments formed by such partitions various grades of filling composition, subjecting the composition to a slight initial pressure to initially compact the same, and subjecting the body of composition to a relatively high pressure to compact the same into a single integral block.

In witness whereof, I hereunto set my hand.

MURRELL R. DE FRANCE.